United States Patent
Gapontsev et al.

(10) Patent No.: US 11,719,993 B2
(45) Date of Patent: Aug. 8, 2023

(54) HIGH POWER LASER CONVERTER BASED ON PATTERNED SRB4B07 OR PBB407 CRYSTAL

(71) Applicant: IPG PHOTONICS CORPORATION, Oxford, MA (US)

(72) Inventors: Valentin Gapontsev, Oxford, MA (US); Aleksander Cherepakhin, Oxford, MA (US); Anatolii Zamkov, Oxford, MA (US); Nikolay Evtikhiev, Oxford, MA (US); Dan Perlov, Oxford, MA (US); Aleksander Zaytsev, Oxford, MA (US); Andrey Sadovskiy, Oxford, MA (US); Nikita Radionov, Oxford, MA (US)

(73) Assignee: IPG PHOTONICS CORPORATION, Marlborough, MA (US)

(*) Notice: Subject to any disclaimer, the term of this patent is extended or adjusted under 35 U.S.C. 154(b) by 108 days.

(21) Appl. No.: 17/415,090

(22) PCT Filed: Dec. 18, 2019

(86) PCT No.: PCT/US2019/067135
§ 371 (c)(1),
(2) Date: Jun. 17, 2021

(87) PCT Pub. No.: WO2020/132043
PCT Pub. Date: Jun. 25, 2020

(65) Prior Publication Data
US 2022/0066283 A1   Mar. 3, 2022

Related U.S. Application Data

(60) Provisional application No. 62/781,386, filed on Dec. 18, 2018.

(51) Int. Cl.
 *G02F 1/355* (2006.01)
 *G02F 1/37* (2006.01)
 (Continued)

(52) U.S. Cl.
 CPC .......... *G02F 1/3551* (2013.01); *G02F 1/3501* (2013.01); *G02F 1/353* (2013.01);
 (Continued)

(58) Field of Classification Search
 CPC ........ G02F 1/3501; G02F 1/353; G02F 1/354; G02F 1/355; G02F 1/3551; G02F 1/3558;
 (Continued)

(56) References Cited

U.S. PATENT DOCUMENTS

| | | | |
|---|---|---|---|
| 2014/0362880 A1* | 12/2014 | Chuang | G02F 1/3558 372/22 |
| 2016/0240996 A1* | 8/2016 | Vogler | G02F 1/3534 |
| 2022/0066284 A1* | 3/2022 | Perlov | C30B 33/00 |

FOREIGN PATENT DOCUMENTS

| | | | | |
|---|---|---|---|---|
| DE | 102009028819 A1 * | 2/2011 | | G02F 1/39 |
| WO | WO-2019222263 A1 * | 11/2019 | | G02F 1/3509 |

OTHER PUBLICATIONS

Aleksandrovsky et al., "Deep UV generation and fs pulses characterization using strontium tetraborate", May 18, 2011, Proc. SPIE 8071, Nonlinear Optics and Applications V, 80710K, 9 pgs. (Year: 2011).*

(Continued)

*Primary Examiner* — Daniel Petkovsek
(74) *Attorney, Agent, or Firm* — Yuri B. Kateshov, Esq.

(57) ABSTRACT

The disclosed laser system is configured with a laser source outputting light at a fundamental frequency. The output light is incident on a frequency converter operative to convert the fundamental frequency to a higher harmonic including at least one frequency converting stage. The frequency con- (Continued)

verter is based on a $SrB_4O_7$ (SBO) or $PbB_4O_7$ (PBO) nonlinear crystal configured with a plurality of domains. The domains have periodically alternating polarity of the crystal axis enabling a QPM use and formed with each with highly parallel walls which deviate from one another less than 1 micron over a 10 mm distance.

11 Claims, 3 Drawing Sheets

(51) Int. Cl.
```
G02F 1/39      (2006.01)
H01S 3/00      (2006.01)
H01S 3/11      (2023.01)
H01S 3/23      (2006.01)
G02F 1/35      (2006.01)
G02F 1/377     (2006.01)
H01S 3/109     (2006.01)
```
(52) U.S. Cl.
CPC ............. *G02F 1/354* (2021.01); *G02F 1/355* (2013.01); *G02F 1/3558* (2013.01); *G02F 1/37* (2013.01); *G02F 1/3775* (2013.01); *G02F 1/39* (2013.01); *H01S 3/0092* (2013.01); *H01S 3/109* (2013.01); *H01S 3/11* (2013.01); *H01S 3/2308* (2013.01)

(58) Field of Classification Search
CPC . G02F 1/37; G02F 1/3775; G02F 1/39; H01S 3/0092; H01S 3/109; H01S 3/11; H01S 3/2308
See application file for complete search history.

(56) References Cited

OTHER PUBLICATIONS

Aleksandrovsky et al., "Observation of spontaneously grown domain struture in SBO crystals via nonlinear diffraction", Apr. 4, 2007, Proc. SPIE 6610, Laser Optics 2006: Solid State Laser and Nonlinear Frequency Conversion, 66100V, 6 pgs. (Year: 2007).*

Aleksandrovsky et al. "Nonlinear Optical Processes in Domain Structures of Strontium Tetraborate", Optics and Spectroscopy, 2009 , vol. 107, No. 3, pp. 359-362 (Year: 2009).*

Yasunori Tanaka at al., "Kyropoulos growth of a 300 g SrB407 single crystal using a twin-type stirring blade", Japanese Journal of Applied Physics, vol. 61, Jun. 21, 2022, pp. 075503.

Aleksandr S. Aleksandrovsky et al., "Applications of Random Nonlinear Photonic Crystals Based on Strontium Tetraborate", Crystals, 2012, vol. 2, pp. 1393-1409.

Petra Becker., "Borate Materials in Nonlinear Optics", Advanced Materials, 1998, vol. 10:13, pp. 979-992.

Kensaku Maeda et al., "Fabrication of Quasi-Phase-Matching Structure during Paraelectric Borate Crystal Growth", Applied Physics Express, vol. 6, 2013, pp. 015501.

V.V. Atuchin et al., "Electronic structure of α-SrB407:experiment and theory", Journal of Physics: Condensed Matter, vol. 25, 2013, pp. 085503.

A.I. Zaitsev et al., "Morphology of the polar twin structure in Czochralski grown α-Sr8407 crystals", Journal of Crystal Growth, vol. 416, 2015, pp. 17-20.

P.A. Popov et al. "Heat Conductivity and Thermal Expansion of Crystal Strontium Tetraborate α-Sr8407", Doklady Physics, vol. 57(2): pp. 54-56, 2012.

Yu S. Oseledchik et al., "New nonlinear optical crystals: strontlum and lead tetraborates", Optical Materials 4, 1994, pp. 669-674.

A.I. Zaitsev et al., "Nonlinear Optical, Piezoelectric, and Acoustic Properties of SrB407", Inorganic Materials, 2006, vol. 42(12), pp. 1360-1362.

V. Petrov et al., "Application on the nonlinear crystal SrB407 for ultrafast diagnostics converting to wavelengths as short as 125 nm" Optic Letters, Feb. 15, 2004; vol. 29(4): pp. 373-375.

Y. Tanaka et al., "Growth of high-quality transparent SrB407 single crystals with high degradation resistance for DUV laser applications", Applied Physics Express 11, 2018, p. 125501.

V.I. Zinenko et al., "Vibrational Spectra and Elastic Piezoelectric and Polarization Properties of the α-Sr8407 Crystal", Journal of Experimental and Theoretical Physics, 2012, vol. 115(3): pp. 455-461.

* cited by examiner

HIGH POWER LASER CONVERTER BASED ON PATTERNED SRB4BO7 OR PBB4O7 CRYSTAL

BACKGROUND OF THE DISCLOSURE

Field of the Disclosure

The disclosure relates to a high power solid state laser provided with at least one nonlinear converter based on patterned Strontium Tetraborate SrB4BO7 (SBO) and Lead Tetraborate PbB4O7 (PBO) crystals.

Background of the Disclosure

The demand for laser tools in the ultraviolet (UV) and particularly high power deep UV (DUV) range is growing enormously to address the needs experienced by heavy industries, medicine, data storage, optical communication, entertainment and others. Advances in semiconductor photolithography, micromachining and material-processing applications, for example, are driving demand for coherent light sources operating in UV and DUV spectral regions.

Although some gas lasers, such as excimer lasers can emit isolated wavelengths of coherent light in the UV and DUV spectral regions with a high average output power, compact and efficient solid-state lasers with nonlinear optical (NLO) crystals in this spectral range are still needed due to their well-known high efficiency, low maintenance, small footprint and overall low cost. The performance of solid-state lasers in the UV and DUV spectral regions depends mostly on advances in the fabrication of efficient and reliable NLO crystals discovered over the last two decades.

The copending U.S. patent application Ser. No. 17/415,211 ('211) discloses a method for fabricating a patterned non-ferromagnetic nonlinear SBO or PBO crystal fully incorporated herein by reference. This sub-group of borates has some remarkable properties. First, it has a uniquely large (even among borates) bandgap of ~9 eV and its UV cut-off is about 130 nm. There is no literature data, but very likely (as many other borates) the SBO crystal should be very transparent in VIS near infrared (IR). Its absorption should be in a single ppm/cm range. It is mechanically stable and non-hydroscopic. It is easy to grow this crystal by the known conventional techniques.

In addition, these crystals have a very high (for borate) thermal conductivity of ~16 W/m*K. It is an order of magnitude higher than that of BBO and LBO crystal. Last but not least, the SBO crystal is one of a very few non-linear materials (if not the only one) which does not have two-photon absorption (TPA) at 266 nm—a nonlinear effect increasing the power loss and light-induced damage. Combined with the unique optical transparency and high LIDT, the SBO/PbBO crystal is probably the only non-linear material capable of withstanding sustainable multi-watt operation (pulsed and CW) at 266 nm with fluencies typical for non-linear conversion regimes (~100-500 MW/cm$^2$). Clearly with the periodic phase matching structure method of fabrication disclosed in the co-pending US patent application '211, this group of borates is an ideal material for nonlinear interactions.

It is, therefore, desirable to provide a laser based on SBO or PBO crystal.

SUMMARY OF THE DISCLOSURE

This need is satisfied by a group of high power laser systems capable of operating in a UV frequency range. All of the disclosed systems have a common general optical schematic. The latter is provided with a laser source and at least one frequency converter so as to output sub-nanosecond, preferably picosecond pulses in a UV spectral region. As one of ordinary skill readily knows, picosecond (ps) fiber lasers participating in generating higher harmonics, such as UV light, are advantageous over ns fiber lasers because the nonlinear crystals in the ps pulsed regime have longer useful life than that of crystals irradiated by ns pulses. This advantage becomes even more prominent when the SBO or PBO is used since there is no 2-photon absorption is these crystals.

BRIEF DESCRIPTION OF THE DRAWINGS

The above and other aspects and feature will become more readily apparent in conjunction with the following drawings, in which.

SPECIFIC DESCRIPTION

Figure 1:
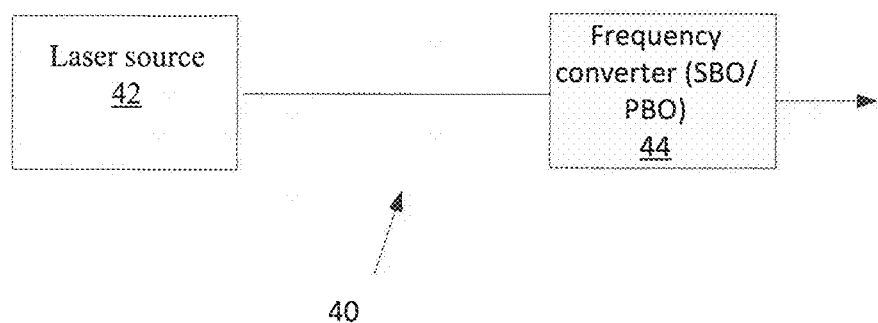
FIG. 1 is a general optical schematic of the inventive laser system.

Reference will now be made in detail to the disclosed inventive concepts. Wherever possible, same or similar reference numerals are used in the drawings and the description to refer to the same or like parts or steps. The drawings are in simplified form being far from precise scale.

FIG. 1 illustrates a general optical schematic 40 of the inventive laser system. The schematic 40 is configured as a source of electromagnetic (EM) radiation 42 incident on a frequency converter 44 which is based, at least in part, on patterned SBO or PBO nonlinear crystal 10 and configured to convert a fundamental frequency into a higher harmonic. Typically, the converters are placed in a single-pass or multi-pass resonator.

The EM source 42 is a laser system operating in various regimes which includes continuous a wave (CW) mode, quasi-continuous wave (QCW) mode and pulsed modes. For many applications, source 42 is a high power source with the output of at least 1 kW and as high as of MWs. However, laser systems operating under a kW power level are also part of the disclosed subject matter.

The configuration of source 42 is not limited to any particular lasing medium. Preferably, it is a solid state laser system including fiber and yttrium aluminum glass (YAG) lasing media, with the disk lasers being a subclass of YAGs. The light emitting ions doped in the lasing media care various rare-earth metals. Since an industrial range of fundamental wavelengths and their higher harmonics is mostly associated with laser sources emitting light in a 1-2 μm range, light emitters may include ions of ytterbium (Yb), erbium (Er), neodymium (Nd), and Thulium. The mentioned elements are however do not represent the exclusive list of all rare earth elements that may be used for light generation.

The architecture of laser source 42 may be represented by a variety of specific configurations. For example, the illustrated exemplary schematic of laser source includes a combination of oscillator 43 and power amplifier 44 representing a well-known master oscillator (MO) power amplifier (PA) scheme (MOPA). The MO 43 may include semiconductors or fibers preferably operating at a single frequency. For example, MO 43 can be configured in accordance with the schematics disclosed in PCT/US15/65798 and PCT/US15/52893 which are owned by the assignee of the current applications and incorporated here by reference in their entirety. Considering that modern power levels of known oscillators have reached a kW level, the architecture of source 42 may be represented only by lasers omitting thus the amplifier. As to the amplifier, its examples can be found in PCT/US2017/064297 disclosing an Yb/YAG system or U.S. Pat. No. 8,068,705 disclosing a fiber amplifier and many others owned by the assignee of the current application and fully incorporated herein by reference. Regardless of its configuration, laser source 42 preferably outputs a single frequency, single transverse mode sub-nanosecond output in the QCW and pulsed regime. However, a beam quality factor $M^2$ may be higher than 1, for example 1.5.

Figure 2:
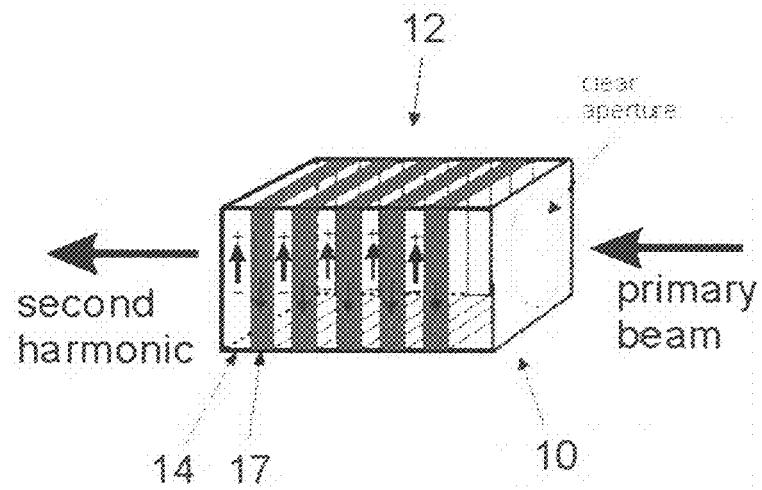
FIG. 2 shows a patterned SBO/PBO crystal of the inventive system.

Referring to FIGS. 1 and 2, frequency converter 44 operates to generate a second harmonic (SH), third harmonic (TH), fourth harmonic (FH), and other higher harmonics as well as to perform optical parametric interactions. The SBO or PBO crystal 10 is configured with a periodic structure 12 of domains 30 and 32 having respective opposite polarities +/− which alternate one another. These domains have highly parallel walls. The periodic structure 12 allows the use of a quasi-phase-modulation (QPM) technique to generate high harmonic wavelength of the fundamental wave which includes second harmonic generation, third and higher harmonic generation, and optical parametric interactions. Recent experiments conducted by the Applicants resulted in crystal 10 provided with a volume periodic pattern which includes a sequence of uniformly dimensioned 3D-domains 30, 32 having respective positive and negative polarities which alternate one another and provide the crystal with a clear aperture having a diameter of up to a few centimeters. The domains each are configured with a uniform thickness corresponding to the desired coherence length 1 and ranging from about 0.2 μm to about 20 μm and a clear aperture which has a dimeter varying from about 1 mm to about 5 cm. The crystal 10 can be utilized as an optical element, such as a frequency converter incorporated in a laser which operates in a variety of frequency ranges. For example, crystal 10, configured to convert a fundamental frequency of laser source 42 to a DUV range, has a coherence length 1 ranging between 0.2 to about 5 nm. The volume pattern may extend through the entire thickness of crystal block 10 between faces +C and −C, or terminate at a distance from one of these faces. The crystal 10 is based on the discussed above unique qualities and disclosed in copending, co-owned U.S. application 62/781,371 which is filed concurrently with the subject matter application which incorporates it by reference in its entirety.

The SBO/PBO crystal 10 is characterized by a relatively short UV absorption cut-off ($\lambda_{cutoff}$) or wide energy bandgap ($E_g$) which guarantee the transmittance in the UV and DUV spectra. Moreover, the large bandgap significantly decreases the two-photon absorption or multi-photon absorption, and thus in turn increases the laser-induced damage threshold in a crystal and results in reduced non-desirable thermo-optical effects. Linear absorption of borates is typically very low as well.

Accordingly, SBO/PBO crystal is particularly attractive when used in laser systems operating in ultraviolet/deep ultraviolet (UV/DUV) frequency ranges. UV/DUV lasers are widely employed in various applications. For instance, a DUV at 266 nm has been utilized as an external seed of a free-electron laser with outputs as short as about 4 nm so useful in the scientific research beyond the carbon K-edge. The industrial applications, laser machining of wide bandgap materials, microelectronics and many other are direct beneficiaries of the DUV lasers owing to their high photon energy. The conversion schemes are numerous and examples thereof are disclosed hereinbelow.

Figure 3:
FIG. 3 is an exemplary schematic of the inventive system of FIG. 1 used for generation of the FH.

Referring to FIG. 3, an exemplary schematic setup of system 40 includes converter 46 configured with SHG 46 and FHG 48 stages. The SHG 46 doubles the frequency of the pump wave in a 1 μm wavelength range to Green light and the latter continuing frequency conversion to obtain ultraviolet/deep UV (UV/DUV 50) light at or lower than a 2xx nm wavelength. For example, a pump wavelength at a 1060 nm output by source 42 (fundamental frequency ω), is converted into a second harmonic 2ω (532 nm wavelength) in SHG 46 which, in turn, is converted into the fourth harmonic 4ω (266 nm wavelength.) The SHG 46 may be based on BBO, LBO CLBO, SBO, PBO and other nonlinear crystals. The FHG 48 includes SBO/PBO crystal 10.

Figure 4:
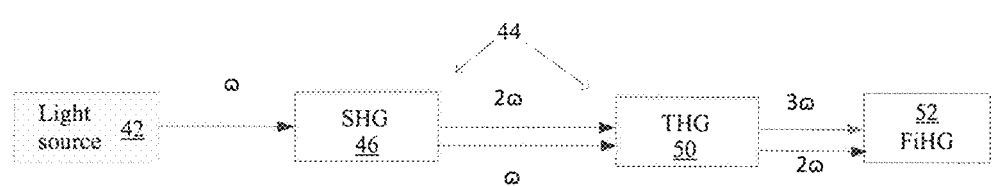
FIG. 4 is an exemplary schematic of the inventive system of FIG. 1 used for generation of the third and higher harmonics.

FIG. 4 exemplifies a schematic configured to generate a TH (THG) 50. The system 40 includes source 42 outputting light at fundamental frequency ω which is incident on SHG 46. The latter 46 converts the fundamental frequency into second harmonic 2ω. The THG 50 receives a remaining portion of light at the fundament frequency and second harmonic and combines these frequencies to create the third harmonic. The SHG 46 may have the configuration of FIG. 3, while THG 50 includes SBO/PBO crystal 10. A non-inclusive example can be illustrated by a fundamental wavelength of 1064 nm which eventually is converted into the TH of about 355 nm. The system 40 may be further provided with a FiHG 52 combining the unused SH and generated TH.

Figure 5:
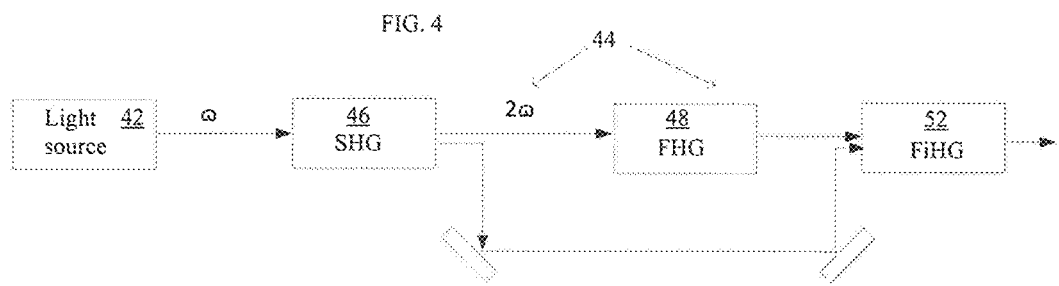
FIG. 5 is an exemplary schematic of the inventive system of FIG. 1 used for generation of the fifth harmonic.

FIG. 5 illustrates still another example of system 40 with converter 44 configured to generate the fifth harmonic (FiHG). The converter 44 operates by initially generating the SH in SHG 46. The unused light at the fundamental (pump) is tapped off the SH at the output of SHG 46 and further guided to FiHG 52 along a path defined by reflective elements, such as mirrors or prisms. If desired, the unconverted light at the fundamental frequency can be guided through FHG 48.

Figure 6:
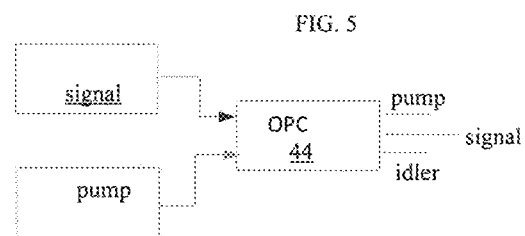
FIG. 6 is an exemplary schematic of the inventive system of FIG. 1 used for parametric conversion.

Based on the foregoing, SBO/PBP QPM crystal 10 can be used for frequency doubling, tripling etc., as well as for sum and difference frequency generation. It also can be used for parametric amplification. Referring to FIG. 6, light at a signal wavelength propagates through crystal 10 together with a pump beam of shorter wavelength resulting in several outputs which include an idler, residual pump beam and signal separate outputs, as well known to one of ordinary skill.

As known to one of ordinary skill, it is irrational to use standard crystals, such as PPKTP or PIPLIN for generating the FH because this harmonic of 1-2" fundamental wavelength coincides with (or even falls beyond) the cutoff wavelength of these materials. The crystals that may generate the FH have very low nonlinearity. The SBO/PBO crystal, however, is highly nonlinear and has a cutoff wavelength around 130 nm which obviously extends its conversion abilities to this wavelength allowing thus inventive laser system 40 operate way below 200 nm and even below 160 nm, which is not possible to realize with the known crystals.

Figure 7:
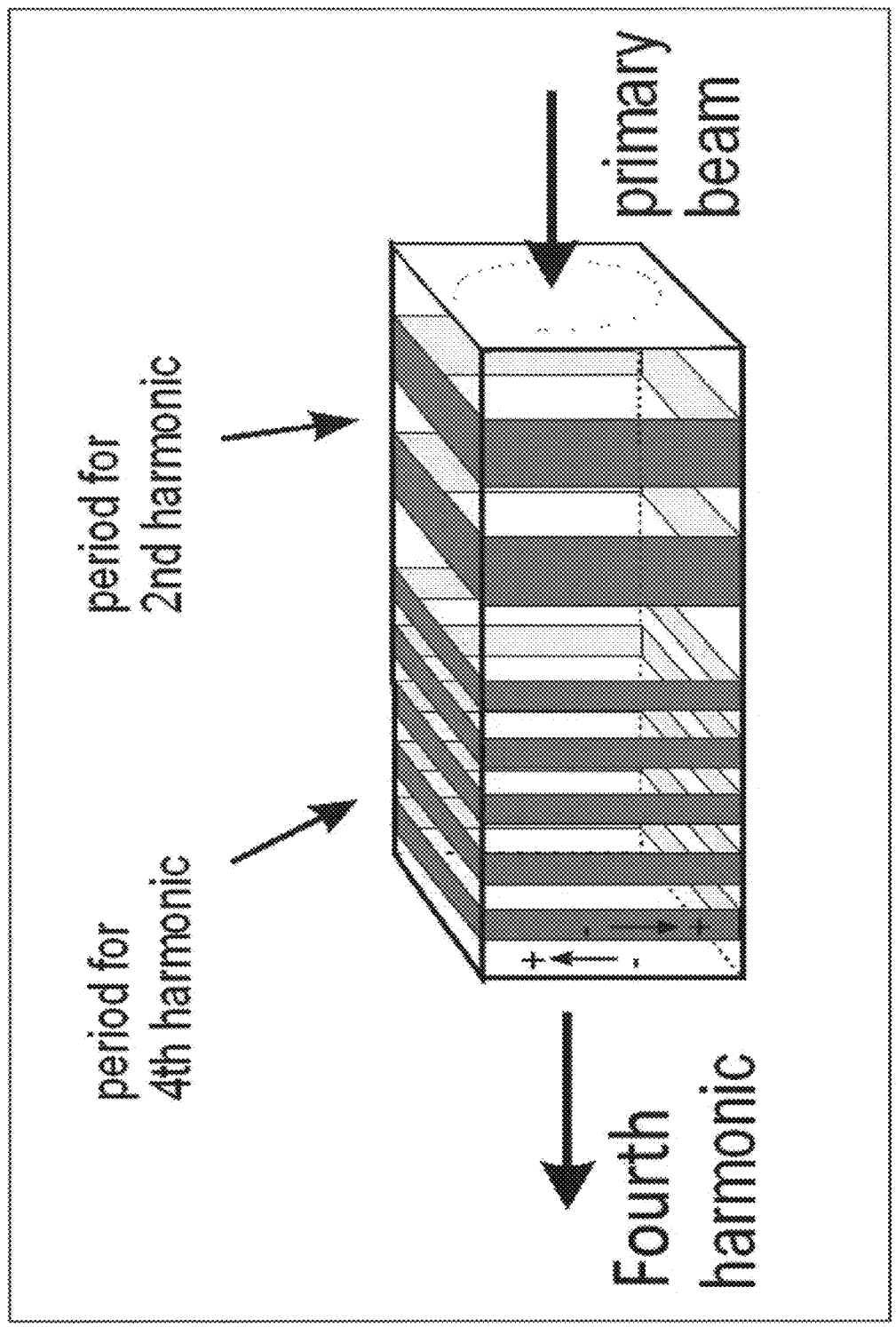
FIG. 7 is the SBO/PBO crystal of FIG. 2 configured from a single slab to provide a frequency conversion of the fundamental frequency into a plurality of successive harmonics.

FIG. 7 illustrates another configuration of system 40 including laser source 42 which is a diode laser and SBO/PBO crystal 10. In light of the characteristics of the latter. SBO/PBO 10 is configured from a monolithic slab with can sequentially double the fundamental frequency and further generate a higher harmonic at for example 355 nm and 266 nm. For this reason, the domain period along a path of light at the fundamental frequency varies from the one for SHG and, then, for example, the FHG. Such a configuration can be used in a microchip of no longer than 5-10 mm and including a laser diode on vanadate and SBO 10 to produce a milliwatt (mW) output.

It is to be understood that while the invention has been described in conjunction with the detailed description thereof, the foregoing description is intended to illustrate and not limit the scope of the invention, which is defined by the scope of the appended claims. For example, the pulsed regime of the disclosed systems can be implemented by utilizing a chirp pulse amplification technique. The pulse laser sources further may be based on a passively mode locked or actively mode locked lasers outputting nanosecond, and sub nanosecond, i.e., femtosecond and picosecond pulses. The average power of the output of the disclosed pulsed systems may vary between milliwatts (mW) and about 100 W in UV/DUV frequency ranges. Accordingly, other aspects, advantages, and modifications are within the scope of the following claims.

The invention claimed is:

1. A laser system, comprising:
a laser source outputting light at a fundamental frequency; and
a frequency converter operative to convert the fundamental frequency into a higher harmonic and including at least one frequency converting stage which is based on a Strontium Tetraborate $SrB_4O_7$ (SBO) or Lead Tetraborate $PbB_4O_7$ (PBO) crystal, wherein the SBO/PBO crystal is configured with a plurality of uniform domains with defining a periodic structure an having respective periodically alternating polarities of the crystal axis so as to enable quasi-phase-matching (QPM).

2. The laser system of claim 1, wherein the SBO/PBO crystal is configured to generate the higher harmonic selected from the group consisting of a second harmonic, third harmonic, fourth harmonic, and fifth harmonic and a combination of the higher harmonics.

3. The laser system of claim 2, wherein the SBO/PBO crystal outputs a single mode light at a wavelength of about 130 nm and average power of at les 10 W at the fourth harmonic.

4. The laser system of claim 1, wherein the SBO/PBO crystal is configured to provide optical parametric interactions.

5. The laser system of claim 1, wherein the SBO/PBO crystal has a thickness of each domain for VIS-DUV light ranges varying between 0.2 µm and about 20 µm, and a clear aperture with a diameter ranging from about 1 mm to about 5 cm.

6. The laser system of claim 1, wherein the laser source includes a laser system operating in a continuous wave (CW), quasi-continuous wave (QCW) or pulsed regime.

7. The laser system of claim 6, wherein the laser source includes a solid-state laser selected from the group consisting of a fiber laser, yttrium aluminum glass (YAG) and disk laser, the solid state laser being configured with a gain medium doped with light emitting dopants, which are selected from rare-earth elements, and outputting light in a 1 to 2 µm wavelength range.

8. The laser system of claim 6, wherein the laser source has a master-oscillator (MO) power amplifier (PA) configuration.

9. The laser system of claim wherein 8, the laser source outputs a train of pulses in a nanosecond-picosecond pulse duration range.

10. The laser system of claim 1, wherein the frequency converter includes a single, monolithic slab of SBO/PBO crystal formed with two different domain periods, wherein light at the fundamental frequency propagates along a path through the slab which has an upstream end thereof provided with the period for a second harmonic generation (SHG) and a downstream end of the slab having the period for the higher harmonic.

11. The laser system of claim 1, wherein the uniform domains have highly parallel walls deviating from one another less than 1 µm over a 10 mm distance.

* * * * *